(12) United States Patent
Lee

(10) Patent No.: US 9,182,007 B2
(45) Date of Patent: Nov. 10, 2015

(54) DAMPER PULLEY ASSEMBLY OF VEHICLE

(71) Applicants: Hyundai Motor Company, Seoul (KR); Kia Motors Corporation, Seoul (KR)

(72) Inventor: Jae Kwon Lee, Suwon-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 25 days.

(21) Appl. No.: 14/137,935

(22) Filed: Dec. 20, 2013

(65) Prior Publication Data

US 2015/0072818 A1 Mar. 12, 2015

(30) Foreign Application Priority Data

Sep. 9, 2013 (KR) ........................ 10-2013-0108018

(51) Int. Cl.
- F16H 55/36 (2006.01)
- F16H 7/20 (2006.01)
- F16F 15/14 (2006.01)

(52) U.S. Cl.
CPC ................ *F16F 15/14* (2013.01); *F16H 55/36* (2013.01)

(58) Field of Classification Search
CPC .... F02B 2075/027; F02B 63/02; F01L 1/024; F16H 3/54; F16H 55/36
USPC .................................................. 474/166, 198
See application file for complete search history.

(56) References Cited

U.S. PATENT DOCUMENTS

| | | | | |
|---|---|---|---|---|
| 3,469,473 A | * | 9/1969 | Zaiser Wolfgang et al. .. | 475/153 |
| 4,794,816 A | * | 1/1989 | Serizawa et al. ............. | 74/574.4 |
| 4,862,770 A | * | 9/1989 | Smith ........................... | 475/324 |
| 5,580,325 A | * | 12/1996 | Hirota et al. .................. | 474/144 |
| 5,954,120 A | * | 9/1999 | Aoki et al. ...................... | 165/43 |
| 6,027,032 A | * | 2/2000 | Aoki et al. ............... | 237/12.3 R |
| 6,079,384 A | * | 6/2000 | Koishikawa et al. ...... | 123/195 P |
| 6,250,276 B1 | * | 6/2001 | Boll ........................... | 123/198 R |
| 6,530,355 B2 | * | 3/2003 | Ito et al. ..................... | 123/196 R |
| 6,612,275 B2 | * | 9/2003 | Immel et al. ................ | 123/90.31 |
| 6,623,317 B2 | * | 9/2003 | Roycroft et al. ........... | 440/12.54 |
| 6,648,095 B2 | * | 11/2003 | Abend et al. .................. | 180/375 |
| 6,878,094 B2 | * | 4/2005 | Kitamura et al. ................. | 477/5 |
| 7,618,338 B2 | * | 11/2009 | Greenwood .................... | 474/93 |
| 7,758,465 B2 | * | 7/2010 | Serkh et al. ................... | 475/318 |
| 7,985,150 B2 | * | 7/2011 | Kamdem ........................ | 474/94 |
| 2002/0043771 A1 | * | 4/2002 | Ito et al. ........................ | 277/591 |
| 2002/0066433 A1 | * | 6/2002 | Ito et al. ..................... | 123/196 R |
| 2003/0029392 A1 | * | 2/2003 | Komorowski ............. | 123/41.44 |

(Continued)

FOREIGN PATENT DOCUMENTS

| | | |
|---|---|---|
| JP | 2002-70577 A | 3/2002 |
| JP | 2011-33151 A | 2/2011 |

*Primary Examiner* — Henry Liu
(74) *Attorney, Agent, or Firm* — Morgan, Lewis & Bockius LLP

(57) ABSTRACT

A damper pulley assembly of vehicle may include a crankshaft rotating by a power transmitted from an engine, a hub including a hub body formed cylindrical hollow shape so that the crankshaft is inserted and a hub ring protruded outside of the hub body, a pulley coupled outside of the hub ring, a combining ring formed cylindrical hollow shape so as to be coupled outside of the hub body, and an oil seal provided between outside of the combining ring and inside of the cylinder block and preventing leakage of engine oil of the cylinder block, wherein the hub is made of low density material compared to the pulley, and the combining ring is made of high stiffness compared to the hub.

8 Claims, 6 Drawing Sheets

(56) References Cited

U.S. PATENT DOCUMENTS

| | | |
|---|---|---|
| 2009/0169400 A1* | 7/2009 | Paarikh et al. ............... 417/362 |
| 2011/0061616 A1* | 3/2011 | Watanabe ................. 123/90.15 |
| 2011/0174252 A1* | 7/2011 | Tada ......................... 123/90.15 |
| 2012/0055436 A1* | 3/2012 | Antchak et al. .......... 123/179.25 |
| 2012/0283930 A1* | 11/2012 | Venton-Walters et al. ... 701/102 |
| 2012/0286479 A1* | 11/2012 | Ogishi et al. .................. 277/549 |
| 2015/0014941 A1* | 1/2015 | Yanagiguchi et al. ........ 277/549 |
| 2015/0053156 A1* | 2/2015 | Nemoto et al. ............ 123/90.15 |

\* cited by examiner

DAMPER PULLEY ASSEMBLY OF VEHICLE

CROSS-REFERENCE TO RELATED APPLICATION

The present application claims priority to Korean Patent Application No. 10-2013-0108018 filed on Sep. 9, 2013, the entire contents of which is incorporated herein for all purposes by this reference.

BACKGROUND OF THE INVENTION

1. Field of the Invention

The present invention relates to a damper pulley assembly of vehicle. More particularly, the present invention relates to damper pulley assembly that a material of a hub is formed as aluminum and separate combining ring is inserted into the hub in order to couple an oil seal for reducing in weight of the damper pulley assembly.

2. Description of Related Art

Generally, a plurality of piston and connecting rod that is reciprocated is installed in a cylinder block of a vehicle. The connecting rod is fixed to both side of the cylinder block and connected to a crankshaft transforming linear motion of the piston to rotational motion. And a belt is provided at end portion of the crankshaft. A driving force of the crankshaft is transmitted to a generator or steering pump or air compressor through the belt.

FIG. 1 shows partially cut-away perspective view according to conventional damper pulley assembly of a vehicle.

As shown in FIG. 1, a damper pulley assembly 1 according to conventional art includes a crankshaft 10 rotating by a cylinder provided in a cylinder block 11, a hub 20 coupled to the crankshaft 10, and a pulley 40 coupled to outside of the hub 20 and monolithically rotating with the hub 20.

A damper 30 is provided between the hub 20 and the pulley 40 and absorbs an impact generated by a rotation of the hub 20.

And an oil seal 70 is provided between the hub 20 and the cylinder block 11. The oil seal 70 prevents leakage of engine oil in the cylinder block 11 to outside of the cylinder block 11.

The hub 20 and the pulley 40 are heaviest part among the hub pulley assembly 1 according to conventional art. Material of the hub 20 and the pulley 40 is used as high stiffness material such as cast iron (FC25) for a connection with other parts.

Such as, since most parts of the damper pulley assembly 1 are formed as cast iron, weight of the damper pulley assembly 1 is increased. And since heavy damper pulley assembly 1 is rotated by the crankshaft 10, there is a problem that fuel consumption of a vehicle is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing for reducing a weight of a damper pulley assembly integrally rotating with a crankshaft of a vehicle and improving fuel consumption of the vehicle.

In an aspect of the present invention, a damper pulley assembly of a vehicle may include a crankshaft rotating by a power transmitted from an engine, a hub including a hub body formed in a cylindrical hollow shape so that the crankshaft is inserted therein, and a hub ring protruded outside of the hub body, a pulley coupled outside of the hub ring, a combining ring formed in a cylindrical hollow shape so as to be coupled outside of the hub body, and an oil seal provided between outside of the combining ring and inside of a cylinder block and preventing leakage of engine oil of the cylinder block, wherein the hub is made of low density material compared to the pulley, and wherein the combining ring is made of high stiffness compared to the hub.

The pulley is made of cast iron, the hub is made of aluminum, and the combining ring is made of cast iron or high stiffness steel or titanium alloy.

The combining ring is manufactured by insert injection with the hub.

A plurality of protrusion is formed interior of the combining ring.

An interior diameter of the combining ring is formed as a polygon shape and a plurality of protrusion is formed at an inner side surface of the combining ring.

A release agent is mixed when the combining ring is manufactured and bubble is formed at inner side surface of the combining ring.

The release agent is anyone of a talcum powder or a sand or a silica or mixture thereof.

The combining ring is pressed in and fixedly connected to the hub body.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
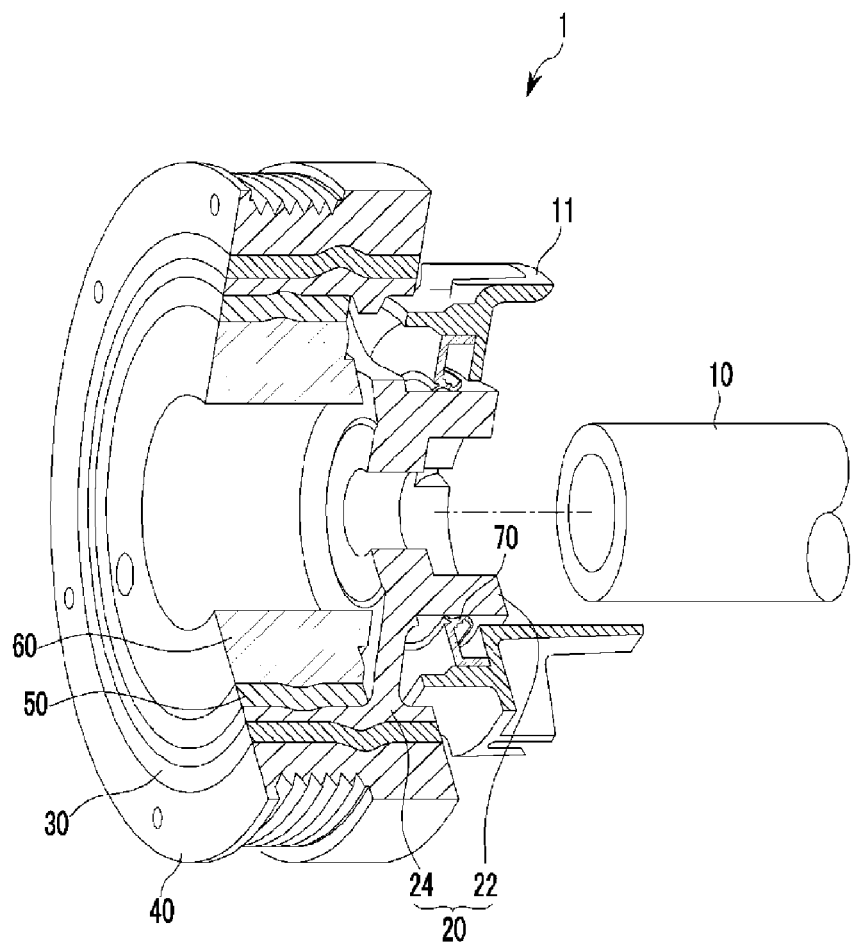
FIG. 1 shows partially cut-away perspective view according to conventional damper pulley assembly of a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe the present invention, portions that are not connected with the description will be omitted. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Figure 2:
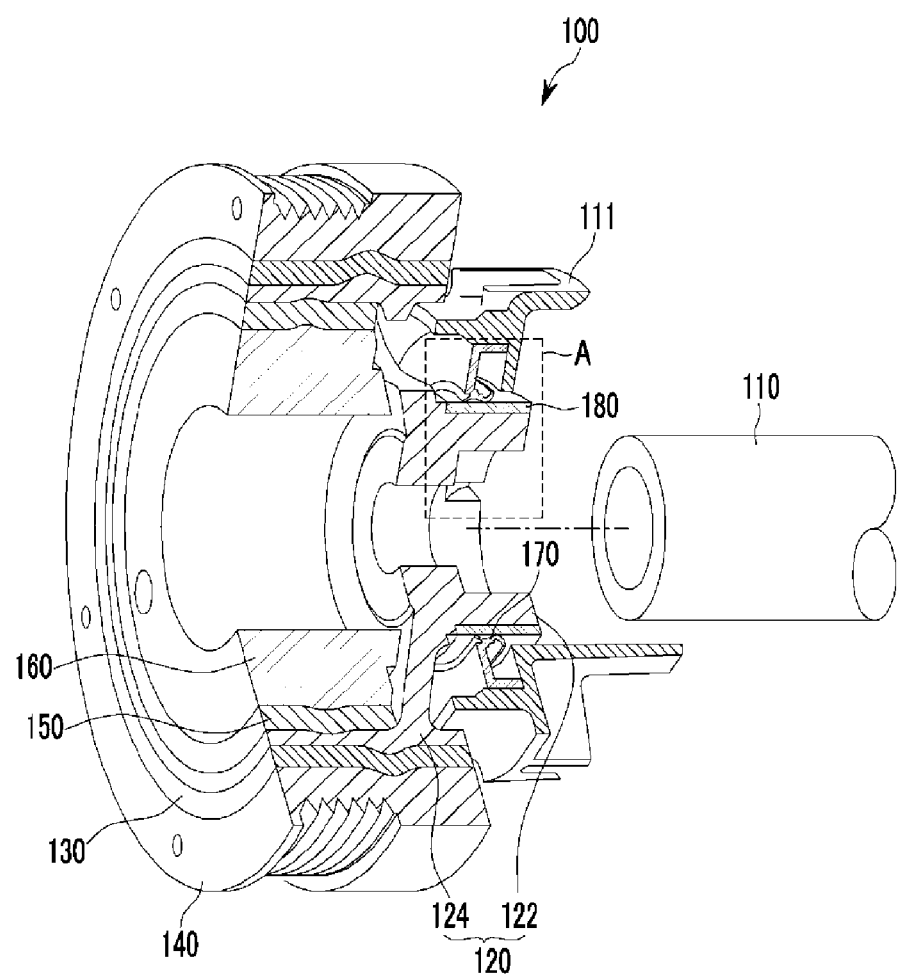
FIG. 2 shows partially cut-away perspective view of a damper pulley assembly of a vehicle according to an exemplary embodiment of the present invention.

FIG. 2 shows partially cut-away perspective view of a damper pulley assembly of a vehicle according to an exemplary embodiment of the present invention. And FIG. 3 shows a partially enlarged view of "A" of FIG. 2.

Figure 3:
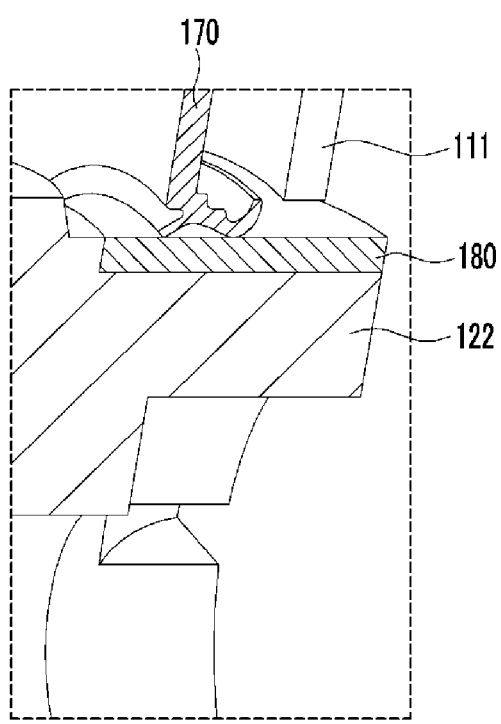
FIG. 3 shows a partially enlarged view of "A" of FIG. 2.

As shown in FIG. 2 and FIG. 3, a damper pulley assembly according to an exemplary embodiment of the present invention includes a crankshaft 110 rotating by a power transmitted from an engine, a hub 120 coupled to the crankshaft 110 and integrally rotating with the crankshaft 110, and a pulley 140 coupled to the hub 120 and integrally rotating with the hub 120.

The hub 120 includes a hub body 122 formed as a cylindrical hollow shape for connection with the crankshaft 110, a hub ring 124 protruded at outside of the hub body 122.

The pulley 140 is coupled to outside of the hub ring 124 formed a plurality of grooves. A belt is coupled to the grooves and a rotational force generated at the engine is transmitted auxiliary components such as a generator or steering pump or air compressor.

And a damper 130 is provided between the hub 120 and the pulley 140. The damper 130 absorbs impact generated by a variation of rotation speed when the hub 120 is integrally rotated with the crankshaft 110.

Also, since the pulley 140 has a predetermined inertial mass, vibration generated by rotation of the crankshaft 110 is absorbed by the inertial mass.

An inner inertia 160 is further provided inside of the hub 120. At this time, an inner damper 150 further provides between the inner inertia 160 and the hub 120. When a natural frequency of a damper pulley assembly 100 is needed to be varied, the inner inertia 160 is used. Also vibration of the damper pulley assembly 100 is reduced by the inner inertia 160.

The hub 120 and the crankshaft 110 are connected by following method. First, end portion of the crankshaft 110 is press-fitted to the hub body 122 and the crankshaft 110 and the hub 120 are connected by engage bolt.

Meanwhile, a combining ring 180 is coupled outside of the hub body 122. The combining ring 180 is formed as cylindrical hollow shape. The combining ring 180 is preferably made of relatively high stiffness and surface hardness compared to the hub 120.

An oil seal 170 is provided between outside of the combining ring 180 and the cylinder block 111. An air-tightness between the hub 120 and the cylinder block 111 is maintained by the oil seal 170 and leakage of engine oil in the cylinder block 111 is prevented by the oil seal 170.

The pulley 140 and the hub 120 should have a predetermined inertial mass or more in order to reduce vibration generated by rotation of the crankshaft 110.

To this end, the pulley 140 is generally made of cast iron FC 25. And the hub 120 is made of aluminum (Al) which is relatively low density compared to the pulley 140. Therefore, although size of the hub 120 is same size, a mass of the hub 120 is decreased. Accordingly, entire mass of the damper pulley assembly 100 can be decreased.

In order to reduce entire mass of the damper pulley assembly 100, it is possible that the pulley 140 is made of light material instead of the hub 120. However in this case, the pulley 140 is provided at radially outside of the crankshaft 110 compared to the hub 120 and larger inertial mass are need in order to reduce vibration generated by rotation of the crankshaft 110. And volume of the pulley 140 is increased.

Therefore, it is preferable that the hub 120 should be made of light material instead of the pulley 140.

However, when the hub 120 is made of light material such as aluminum, then an exterior side of the hub body 122 is inflated, so called barreling, when the crankshaft 110 and hub 120 are coupled by the engage bolt.

And in order to prevent leakage of engine oil by using the oil seal 170 provided between the cylinder block 111 and the hub 120, an exterior side of the hub 120 should have predetermined surface hardness.

However, since the hub 120 is made of aluminum, there is a problem that stiffness and surface hardness of the hub 120 is decreased. To overcome this problem, it is preferable that a combining ring 180 is provided at an exterior of the hub 120.

Figure 4:
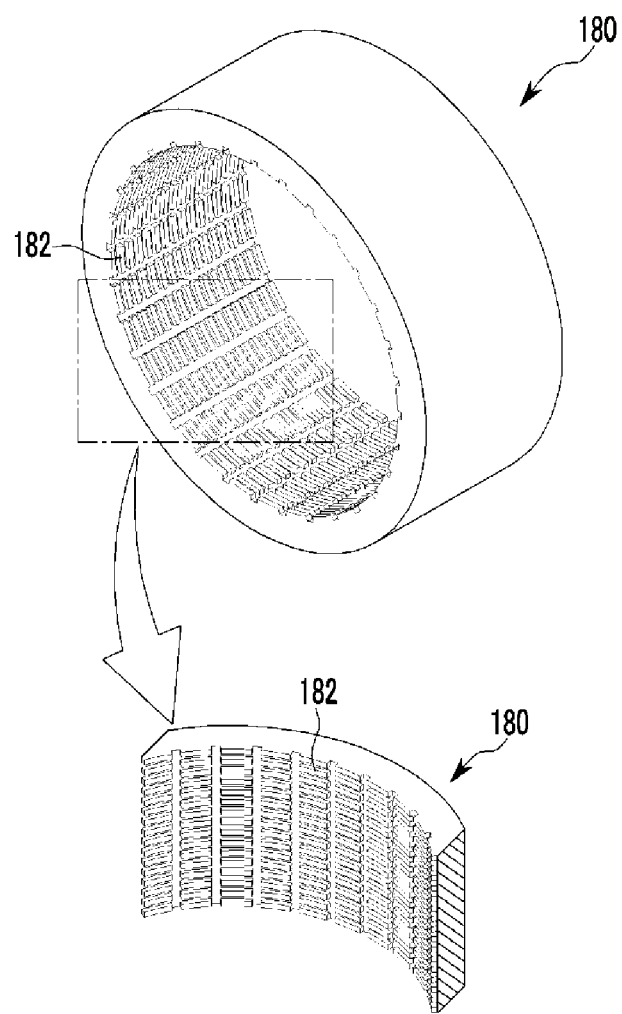
FIG. 4 shows a perspective view a combining ring according to an exemplary embodiment of the present invention.
Figure 5:
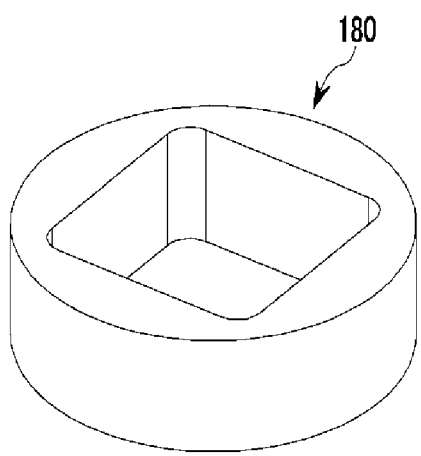
FIG. 5 shows a perspective view of a combining ring according to another exemplary embodiment of the present invention.

FIG. 4 shows a perspective view a combining ring according to an exemplary embodiment of the present invention. And FIG. 5 shows a perspective view of a combining ring according to another exemplary embodiment of the present invention. And FIG. 6 shows a perspective view a combining ring according to another exemplary embodiment of the present invention.

Figure 6:
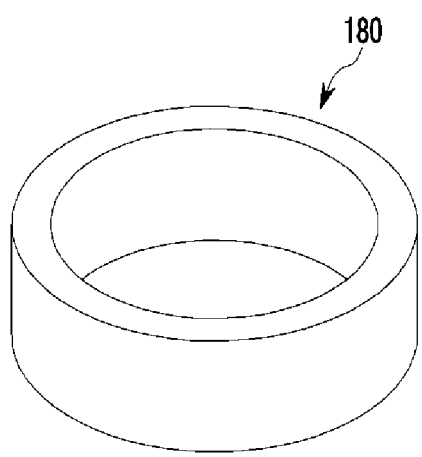
FIG. 6 shows a perspective view a combining ring according to another exemplary embodiment of the present invention.

As shown in FIG. 4 to FIG. 6, the combining ring 180 is formed as cylindrical hollow shape. The combining ring 180 is preferably made of cast iron or high stiffness steel or titanium alloy having high stiffness and high surface hardness.

As shown in FIG. 4, it is preferable that a plurality of protrusions is formed interior of the combining ring 180. Since the plurality of protrusions is formed at the combining ring 180, volume of the combining ring 180 is minimized and weight of the damper pulley assembly 100 is minimized.

Also, since contact area of the combining ring 180 is increased by the protrusions, and connection force between the hub 120 and the combining ring 180 is increased when the combining ring 180 and the hub 120 being made of different kinds of materials are coupled.

As shown in FIG. 5, an interior circumference of the combining ring 180 may be formed as polygon shape. As such, since the interior circumference of the combining ring 180 is formed as polygon shape, slip between the combining ring 180 and the hub 120 is prevented.

And a plurality of protrusions may be formed at an interior circumference of the combining ring 180, volume of the combining ring 180 is minimized and thereby weight of the damper pulley assembly 100 is minimized.

Also, since contact area of the combining ring 180 is increased by the protrusions, and connection force between the hub 120 and the combining ring 180 is increased when the combining ring 180 and the hub 120 being made of different kinds of materials are coupled.

As shown in FIG. 6, the combining ring 180 may be formed as cylindrical hollow shape like FIG. 4 and FIG. 5. The combining ring 180 is manufactured by injection molding and special release agent is mixed with the combining ring 180. At this time, a plurality of protrusion is formed at interior surface of the combining ring 180. The release agent may be anyone of a talcum powder or a sand or a silica or mixture thereof.

If the combining ring 180 is manufactured by mixing the release agent, then thickness of the combining ring 180 is minimized and manufacturing cost is reduced.

The combining ring 180 is preferably formed as high stiffness material compared to the hub 120. As described above, the combining ring 180 is formed as high stiffness material, thereby barreling is prevented.

Also, in order to prevent leakage of engine oil in the cylinder block 111, the combining ring 180 should have high surface hardness. Generally, surface hardness of the exterior surface of the hub 120 contacting the oil seal 170 should be over HRC (Rockwell Hardness C-scale) 30 in order not to be inflated.

That is, the combining ring 180 should have high stiffness and surface hardness. Therefore, the combining ring 180 is preferably made of cast iron or high stiffness steel or titanium alloy.

Since the combining ring 180 is made of a material having high stiffness and surface hardness, abrasion of the exterior surface of the oil seal 170 is prevented and barreling is prevented.

Hereinafter, a coupling method of the combining ring 180 and the hub 120 according to an exemplary embodiment of the present invention.

First, the combining ring 180 is press-fitted into the exterior of the hub body 122. And end portion of the crankshaft 110 is press-fitted into the hub body 122. And the hub 120 and the crankshaft 110 are connected by engage bolt, thereby the damper pulley assembly 100 is connected to the crankshaft 110.

As such, since high stiffness combining ring 180 is press-fitted and fixed to the hub 120, barreling that the exterior surface of the hub 120 is inflated by axial force generated when the crankshaft 110 and the hub 120 are coupled is not occurred.

Meanwhile, the combining ring 180 and the hub 120 may be integrally formed when the hub 120 is manufactured. That is, the hub 120 and the combining ring 180 are integrally manufactured by insert molding after the combining ring 180 is manufactured In detail, the combining ring 180 is seated in a mold frame of the hub 120 and the hub 120 and the combining ring 180 are integrally formed by pouring molten metal into the mold frame.

At this time, a plurality of protrusions are formed at the interior surface of the combining ring 180 by release agent, thereby connection force of the combining ring 180 and the hub 120 is increased.

As described above, according to an exemplary embodiment of the present invention, since the hub is made of aluminum, weight of the damper pulley assembly is reduced and fuel consumption of the vehicle is improved. Also, since high stiffness combining ring is provided at the exterior surface of the hub and the oil seal is provided between high stiffness combining ring and the cylinder block, air-tightness between the cylinder block and the hub is maintained and thereby leakage of engine oil in the cylinder block is prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damper pulley assembly of a vehicle comprising:
   a crankshaft rotating by a power transmitted from an engine;
   a hub including:
      a hub body formed in a cylindrical hollow shape so that the crankshaft is inserted therein; and
      a hub ring protruded outside of the hub body;
   a pulley coupled outside of the hub ring;
   a combining ring formed in a cylindrical hollow shape so as to be coupled outside of the hub body; and
   an oil seal provided between outside of the combining ring and inside of a cylinder block and preventing leakage of engine oil of the cylinder block,
   wherein the hub is made of low density material compared to the pulley, and
   wherein the combining ring is made of high stiffness material compared to the hub.

2. The damper pulley assembly of the vehicle of claim 1,
   wherein the pulley is made of cast iron,
   wherein the hub is made of aluminum, and
   wherein the combining ring is made of cast iron or high stiffness steel or titanium alloy.

3. The damper pulley assembly of the vehicle of claim 1, wherein the combining ring is manufactured by insert injection with the hub.

4. The damper pulley assembly of the vehicle of claim 3, wherein a plurality of protrusions is formed interior of the combining ring.

5. The damper pulley assembly of the vehicle of claim 3, wherein an interior diameter of the combining ring is formed as a polygon shape and a plurality of protrusions is formed at an inner side surface of the combining ring.

6. The damper pulley assembly of the vehicle of claim 3, wherein a release agent is mixed when the combining ring is manufactured and the bubble is formed at an inner side surface of the combining ring.

7. The damper pulley assembly of the vehicle of claim 6, wherein the release agent is any one of a talcum powder or a sand or a silica or mixture thereof.

8. The damper pulley assembly of the vehicle of claim 1, wherein the combining ring is pressed in and fixedly connected to the hub body.

* * * * *